March 12, 1963  E. M. HUNT  3,080,877
CONTROL ASSEMBLY FOR AUTOMATIC PILOT
Filed April 14, 1958  2 Sheets-Sheet 1

INVENTOR.
ELWOOD M. HUNT
BY John C. McGregor and
James G. Eisenman
ATTORNEYS

March 12, 1963  E. M. HUNT  3,080,877
CONTROL ASSEMBLY FOR AUTOMATIC PILOT
Filed April 14, 1958  2 Sheets-Sheet 2

INVENTOR.
Elwood M. Hunt
BY
ATTORNEYS

United States Patent Office 3,080,877
Patented Mar. 12, 1963

3,080,877
CONTROL ASSEMBLY FOR AUTOMATIC PILOT
Elwood M. Hunt, Wayne, Pa., assignor to Aircraft Products Co., Bridgeport, Pa., a corporation of Pennsylvania
Filed Apr. 14, 1958, Ser. No. 728,409
3 Claims. (Cl. 137—82)

This invention relates to automatic pilots for dirigible craft and in particular to a pneumatic control device for use in automatic pilots.

In the co-pending application, Serial No. 728,158, filed April 14, 1958, there is disclosed a complete aircraft automatic pilot system based on pneumatic signal and control techniques. In order to introduce command control signals into this or similar systems and also, if desired, to attenuate instrument-induced pneumatic control or error signals, it has been proposed to connect signal-modulating devices in shunt across pneumatic circuits. Such devices can be used selectively to attenuate pneumatic error signals at a pre-determined rate, or to modulate, through manual control, the existing, balanced condition of the pneumatic circuit in order to introduce an original or command control signal. Because the modulating or controlling devices are located in the most sensitive portions of the pneumatic system, their construction and mode of operation are critical.

Accordingly it is one object of the present invention to provide an improved pneumatic signal modulating device for use in automatic pilots.

Another object of the invention is to provide an instrument for automatically attenuating at a pre-determined rate, a pneumatic error signal appearing in the pneumatic channels of an automatic pilot.

Still another object of the invention is to provide a simplified, reliable, and durable control device for use in automatic pilots of the pneumatic type.

In accordance with the present invention there is provided a pneumatic control device adapted to be connected across a pair of pneumatic conduits carrying, in the form of a differential pressure, pneumatic signals which control the aircraft through suitable pneumatic amplifiers and motors. The pneumatic signals are modulated by the action of instruments, usually gyroscopes, to introduce error factors which are normally corrected by appropriate follow-up control of the aircraft. A pair of pneumatically deformable members, taking the form, for example, of bellows are connected to the respective pneumatic conduits to respond to the pressures therein. Both conduits are also connected to a common, differential valve assembly which is actuated by the complementary motions of the two deformable members. To this end the valve takes the form of a pair of opposed nozzles between which is disposed a flapper which is rigidly secured to a cross piece, in turn coupled at one end to one deformable member and at the other end to the other deformable member. Command signals can be introduced into the system by displacing the flapper, by manual control, between the two nozzles. Rate attenuation is effected automatically by the complementary motions of the two deformable members to cause the flapper to be shifted back and forth between the nozzles in order to bring about pneumatic balance in the two conduits.

The above and other features and objects of the present invention will be apparent to those skilled in the art by having reference to the following specification describing a preferred embodiment of the invention and taken in conjunction with the accompanying drawings, in which.

Figure 1:
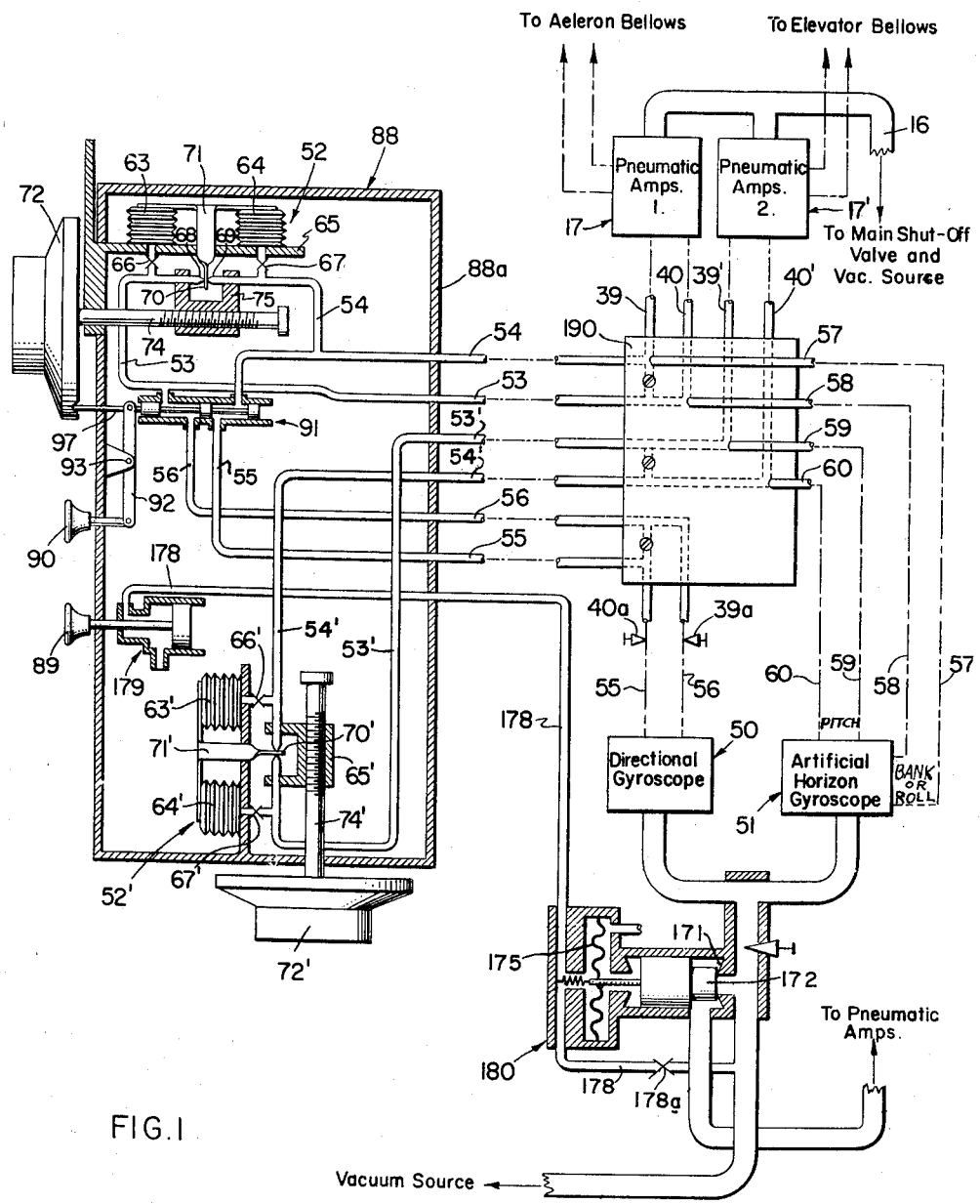
FIGURE 1 is a layout diagram, partly schematic in nature, showing part of the pneumatic system of an automatic pilot and showing the command control and error-signal attenuating unit in which the present invention is embodied.

Referring to FIGURE 1 there is illustrated a command control unit 88 in which are mounted a turn command control unit indicated generally by the numeral 52 and a pitch command control unit indicated generally by the numeral 52'. The unit also includes a master pneumatic or pilot valve control 89 for a valve 179 and a heading set control 90 for a valve 91, the latter being interconnected with the turn command control unit 52. The controls 89 and 90 are disclosed in detail in the co-pending application, Serial No. 728,151, filed April 14, 1958, now Patent 3,044,490, issued July 17, 1962.

The turn command control unit 52 and the pitch command control unit 52' are substantially identical and only one unit is, therefore, described in detail below, like parts of the duplicate unit being identified by like primed reference numerals. The turn command control unit 52 is connected in shunt across a pair of pneumatic conduits 55 and 56 which carry pneumatic signals from the directional gyroscope 50 representative of deviations from desired headings. Conduits 39 and 40 lead to pneumatic amplifiers 17 and 17' which drive motors connected to the control surfaces of the aircraft. Pneumatic signals from the artificial horizon gyroscope 51 introduced by the conduits 57 and 58 are also shunted by the turn command control unit 52. Normally the conduit 55 from the directional gyroscope is connected via the conduit 54 to the conduit 57 from the artificial horizon and both are connected to the output conduit 39. Similarly the conduits 56 and 58 connect in common to the conduit 40 via the conduit 53. In this fashion the turn command control unit is capable of attenuating signals from both the directional and artificial horizon gyroscope.

Figure 2:
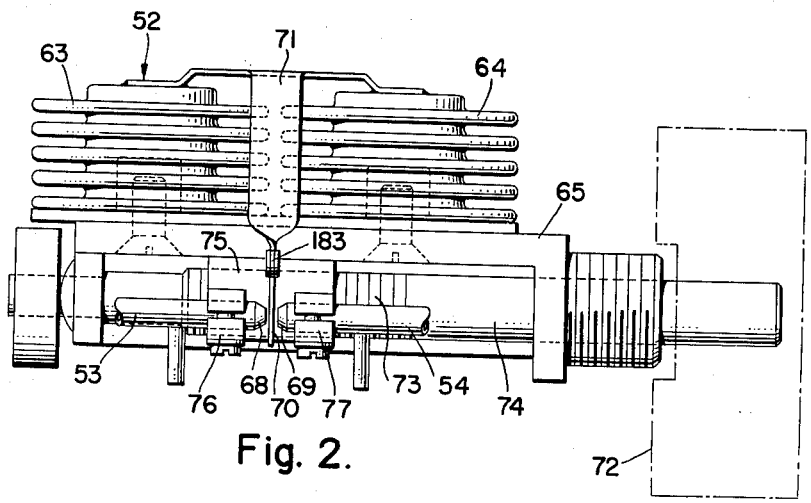
FIGURE 2 is a detailed view in front elevation of a pneumatic control device which is incorporated in the system of FIGURE 1.
Figure 3:
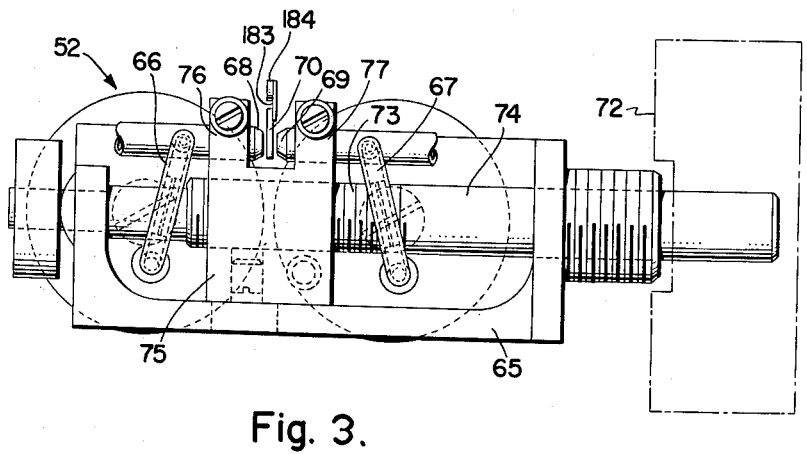
FIGURE 3 is a bottom view of the pneumatic control device of FIGURE 2.

The turn command control unit 52, shown diagrammatically in FIGURE 1 and structural details of which are illustrated in FIGURES 2 and 3, includes a pair of bellows 63 and 64 supported on a common frame or base 65 and coupled respectively to the conduits 53 and 54 by means of constriction conduits 66 and 67 for rate control. The conduits 53 and 54 terminate in constriction nozzles 68 and 69 which vent to the atmosphere. Between the opposed nozzles 68 and 69 is a flapper 70 rigidly supported by a T-shaped bracket assembly 71, the arms of which are respectively secured to the moving ends of the bellows 63 and 64. A change in the relative pneumatic pressures in the bellows will, therefore, cause the flapper 70 to move toward one or the other constriction nozzles 68 and 69 to change the relative air flow into the two nozzles.

Command controls, as opposed to signals from the gyroscope units, are introduced into the turn command control unit 52 by means of a command knob 72 which changes the relative spacing between the flapper 70 and the nozzles 68 and 69. As best seen in FIGURES 1 and 2, this action is effected by shifting the two nozzles axially under the control of a lead screw 73 on the shaft 74 to which the knob 72 is attached. The shaft 74 is journalled in the frame 65 against axial movement, and its lead screw 73 drives a threaded block 75 to which the two nozzles 68 and 69 are secured by clamps 76 and 77, respectively. Turning the knob 72, therefore, enlarges the distance between one of the nozzles and the flapper, while correspondingly decreasing the distance between the other nozzle and the flapper. Conduits 53 and 54 and conduits 66 and 67 are adapted to yield with this motion, which is extremely small. It will be observed that the flapper 70 through its one-piece, T-shaped support bracket 71, is coupled directly to the working ends of the bellows 63 and 64. The pivot axis of the flapper 70 in response to differential movement of the two bellows is, therefore, not captive, and the two bellows, when moving as one in response to variations in the vacuum source, will be free to move without reacting against constraining linkage and without introducing error signals into the control system.

The response of the automatic pilot to correct an error will vary with the magnitude of the error signal. It will be observed that the command control unit 52 is connected in parallel with the directional gyroscope 50 and with the bank signal output portion of the artificial horizon gyroscope 51 by the conduits 53 and 54 and the valve 91. Initially, the error signal from the gyroscope pick-offs impress themselves directly on the pneumatic amplifiers 17 via conduits 39 and 40, this being the most direct i.e. constriction-free path. The rate of response is controlled, however, by the action of the rate bellows 63 and 64 in the command control unit 52, to which the signals are conducted by conduits 53 and 54 through constrictions 66 and 67 respectively. A slow error signal in the form, for example, of a higher vacuum in the conduit 40 than in the conduit 39 will cause the bellows 63 to contract while the bellows 64 expands, the pressures effecting this motion being introduced to the bellows through the constriction conduits 66 and 67. As a result, the flapper 70 is driven to the left, as viewed in FIGURE 2, to close off the atmospheric bleed into the conduit 39 via the constricted orifice 69 of the conduit 54 and to increase the atmospheric bleed to the conduit 41 (presently under higher vacuum) via the constricted nozzle 68 of the conduit 53. The result is controlled attenuation of the original error signal. A fast signal change will momentarily bypass the bellows 63 and 64, this being a function of the time constants of the constrictions 66 and 67, to impose the necessary rapid and forceful compensations on the control surfaces of the aircraft. In this fashion, the servo response is given a phase lead over the actual aircraft displacement. The transient signal components also oppose any tendencies of the system to overshoot the desired correction.

Similarly to the turn error action described above, an error signal from the artificial horizon gyroscope will cause a larger proportion of the vacuum to be introduced into the conduit 58. A pressure differential will occur in the conduits 58 and 57, therefore, which introduces an error signal in the form of decreased pressure in the conduit 40 and increased pressure in the conduit 39. Following the same chain of actions as described above, a correcting motion will be imparted to the ailerons to roll the airplane to the right to correct the error roll to the left. Similarly the unit 52' will be actuated when the plane goes into a dive or a climb or when a pitch command is manually introduced, as described below.

As thus far described, error signals and command fixed heading signals operate the automatic pilot. The system is also capable of command control under the finger tip manipulation of the pilot through the command control units 52 and 52'. FIGURE 1 is a top view of the complete command control assembly, identified generally by the reference numeral 88. This assembly includes, aligned on different axes, the turn command control unit 52 and the pitch command control unit 52', which also receives pitch output signals from the gyroscope 51 via the conduits 59, 53' and 60, 54'. The units 52 and 52', one of which is illustrated in detail by FIGURES 2 and 3, are substantially the same. Turn control is effected through the finger knob 72, preferably arranged in the airplane so that it faces the pilot to be rotated right or left from a neutral, central position. Also included in the housing 88 is, as stated above, the master control knob 89 for the valve 179 and the heading set knob 90 which controls a valve 91 through which the error signals of the directional gyroscope 50 are coupled to the automatic pilot, this valve being interposed in the conduits 55 and 56 to cut the directional gyroscope in and out of the system. Depressing the knob 90 serves to open the valve 91 to cut the directional gyroscope into the system, as described in the co-pending application, Serial No. 728,151, filed April 14, 1958, now Patent 3,044,490, issued July 17, 1962. The valve 179 is a pilot valve which, through a conduit 178 actuates a master power valve 180 for the pneumatic system. The details of this valve are described in detail in said co-pending applications. The master power valve 180 is adapted to couple the vacuum power source of the aircraft to the autopilot system. To this end, the master valve includes a vacuum-power-operated valve element 172 on a seat 171 and driven by a diaphragm 175 so that it can be controlled by the mutually controlled pilot valve 179 through the conduit 178. In operation, when the conduit 178 is vented to the atmosphere by pressing the knob 89 inward the power valve remains closed by the attraction of the vacuum source; when the conduit 178 is cut off from its atmospheric vent by pulling the knob 89 outward, vacuum is applied to the diaphragm chamber through a restriction 178a which draws the power valve element 172 from its seat to open the valve.

While the invention has been illustrated and described in a preferred arrangement, it will be understood that it can take various other forms and arrangements. The invention should not, therefore, be regarded as limited except as defined in the following claims.

I claim:
1. In a pneumatic control for automatic pilots or the like, a pair of pneumatically deformable members movable in response to pressure differentials thereacross, a substantially rigid structural piece joining the moving portions of the two members to move therewith in translational movement in response to equivalent deformations in the two members and in angular movement in response to differential deformations thereof, and a valve element rigidly affixed to the cross piece to move therewith in translation when said cross piece moves in translation and in angular movement when said cross piece moves angularly, said deformable members being disposed side by side for deforming motion on substantially parallel, spaced-apart axes, said valve element comprising a flapper attached to the structural piece joining the deformable members for displacement in angular movement about an axis which is movable with the deformable members, and pneumatic orifices on opposite sides of the flapper to be valved in inverse ratio by the movement thereof, a pair of conduits to carry pneumatic control signals, the differential pressure between the conduits representing a control value for the automatic pilot, means to connect the conduits respectively to the deformable members for actuation thereof, and means to connect the orifices to the respective conduits, whereby the pneumatic signals across the conduits are attenuated.

2. In a pneumatic control mechanism for automatic pilots or the like, a pair of bellows having generally parallel axes, support means for one end of each of said bellows, said support means supporting said one end of each of said bellows adjacent one another, the other end of each of said bellows being freely movable relative to the support means, a mechanical member extending between said other end of each of said bellows and being freely movable therewith, a flapper valve secured to said mechanical member and having a valving surface extending generally parallel to the axes of said bellows, at least one fluid conduit terminating in an orifice closely adjacent to and in operative relationship with said valving surface of said flapper valve, said orifice having an axis generally transverse to said valving surface of said flapper valve, said valving surface being of a length sufficient to be maintained in operative relationship with said orifice over the intended limits of movement of said bellows.

3. In a fluid control mechanism, a pair of members expandable and contractable in response to variations in fluid pressure, said members expanding and contracting along generally parallel axes, support means for one end of each of said members, said support means supporting said one end of each of said members adjacent one another, the other end of each of said members being freely movable relative to the support means, a generally rigid element extending between said other end of each of said members and being freely movable therewith, a flapper valve secured to said rigid element and having a valving surface extending generally parallel to the axis of movement of the center point of attachment of said flapper valve to said rigid element, at least one fluid conduit terminating in an orifice closely adjacent and in operative relationship with said valving surface of said flapper valve, said orifice having an axis generally transverse to said valving surface of said flapper valve, said valving surface being of a length sufficient to be maintained in operative relationship with said orifice over the intended limits of movement of said members.

References Cited in the file of this patent

UNITED STATES PATENTS

| | | |
|---|---|---|
| 1,549,745 | Church | Aug. 18, 1925 |
| 2,409,871 | Krogh | Oct. 22, 1946 |
| 2,441,044 | Tate | May 4, 1948 |
| 2,507,606 | McLeod | May 16, 1950 |
| 2,834,361 | Erbguth | May 13, 1958 |

FOREIGN PATENTS

| | | |
|---|---|---|
| 765,240 | France | Mar. 19, 1934 |
| 893,211 | France | Jan. 24, 1944 |